US006715682B2

(12) United States Patent
Hara

(10) Patent No.: US 6,715,682 B2
(45) Date of Patent: Apr. 6, 2004

(54) DELIVERED ARTICLE RECEIVING LOCKER CABINET

(75) Inventor: Kouichiro Hara, Tokyo (JP)

(73) Assignee: Kabushiki Kaisha Fulltime System, Tokyo (JP)

( * ) Notice: Subject to any disclaimer, the term of this patent is extended or adjusted under 35 U.S.C. 154(b) by 61 days.

(21) Appl. No.: 09/899,266

(22) Filed: Jul. 6, 2001

(65) Prior Publication Data

US 2003/0006288 A1 Jan. 9, 2003

(51) Int. Cl.[7] .................................................. G06K 7/10
(52) U.S. Cl. .................................................. 235/462.14
(58) Field of Search ........................... 235/462.14, 375, 235/382, 381, 383; 700/233, 237, 241; 340/825.34, 825.31; 186/52, 60, 61

(56) References Cited

U.S. PATENT DOCUMENTS

| | | | | |
|---|---|---|---|---|
| 4,894,717 A | | 1/1990 | Komei | 358/108 |
| 5,168,961 A | * | 12/1992 | Schneider | 186/52 |
| 5,223,829 A | * | 6/1993 | Watabe | 340/5.75 |
| 5,235,165 A | * | 8/1993 | Sukegawa et al. | 235/380 |
| 5,475,378 A | * | 12/1995 | Kaarsoo et al. | 340/5.6 |
| 5,950,173 A | * | 9/1999 | Perkowski | 705/26 |
| 5,978,772 A | * | 11/1999 | Mold | 705/16 |
| 6,010,064 A | * | 1/2000 | Umeda et al. | 235/375 |
| 6,456,900 B1 | * | 9/2002 | Kakuta | 700/233 |

FOREIGN PATENT DOCUMENTS

JP 9-330458 12/1997

* cited by examiner

*Primary Examiner*—Daniel St. Cyr
*Assistant Examiner*—Edwyn Labaze
(74) *Attorney, Agent, or Firm*—Armstrong, Kratz, Quintos, Hanson & Brooks, LLP.

(57) ABSTRACT

A delivered article receiving locker cabinet, which has a plurality of lockers, each of which is capable of housing a delivered article and is locked, and ten keys by which the room number of the delivery end, the box number, etc., are inputted, is provided with a barcode reader that is attached to the front face of the locker cabinet for reading a barcode written on a delivery service attached note attached to the delivered article, and a memory that stores information read by the barcode reader. Conventionally, since the delivery person only puts a delivered article into the locker, it is not possible to confirm which delivery service has made the delivery, and, for example, in the case when there is an inquiry from a resident to the managing center as to whether or not a specific delivery service has made a delivery, the managing center cannot make a judgment as to whether or not the specific delivery service has actually made the delivery; consequently, the resulting problem is that it is not possible to identify any delivered article. The above-mentioned arrangement makes it possible to solve such problems.

1 Claim, 4 Drawing Sheets

DELIVERED ARTICLE RECEIVING LOCKER CABINET

BACKGROUND OF THE INVENTION

1. Field of the Invention

The present invention relates to an improvement of a delivered article receiving locker cabinet that is placed at an entrance of a condominium or a tenant building, etc., and that is used for receiving a home delivered article or a delivery from the dry cleaner when the resident of the delivery end is out or in the like situation, so as to allow the resident to receive the article when he or she has come home.

2. Description of the Related Art

A brief explanation will be given of a conventional delivery locker cabinet used for receiving goods such as a home delivered article or a delivery from the dry cleaner. When the delivery end is out, the delivery person operates the ten keys of the delivery locker cabinet to input a room number of the delivery end, empty boxes are displayed on a screen so that the number of a proper empty box is inputted through the ten keys.

Next, when the delivery person puts the article into the specified box, and closes the door, a receipt and a delivery note are issued by a printer; thus, the delivery person receives the receipt, and puts the delivery note into the mail box of the corresponding room number, thereby completing the delivery process.

The receiver of the article, who has found the delivery note put in the mail box, inserts a card that the receiver preliminary received at the time of renting the room into a card reader; thus, the door of the box housing the article is opened, and after taking the article out, the receiver closes the door, thereby completing the receiving process of the article.

Here, each of the delivered article receiving lockers is on-line connected to a managing center, and with respect to the contents of these boxes handled by delivery persons, the managing center manages them so as to know which resident living in which room number has received any delivered article in a condominium or a tenant building, and whether or not the resident has taken the delivered article from the corresponding box.

As a result, in the case when the delivered article has not been taken out by the resident even after a lapse of a predetermined time, the managing center informs the resident of the fact by telephone, etc., so as to ask the resident to take the article.

However, in this conventional method in which: the delivery person only puts the delivered article into the locker through the above-mentioned operation, it is not possible to confirm which delivery service has made the delivery, and, for example, in case where there is an inquiry from a resident to the managing center as to whether or not a specific delivery service has made a delivery, the managing center cannot make a judgment as to whether or not the specific delivery service has actually made the delivery; consequently, the resulting problem is that it is not possible to identify any delivered article.

SUMMARY OF THE INVENTION

The present invention has been devised to solve the above-mentioned problems, and its objective is to provide a delivered article receiving locker cabinet in which a barcode reader is used for reading a barcode written on a delivery service attached note attached to a delivered article distributed by a home delivery service and the contents of the barcode are managed by a managing center so that the managing center readily manages delivered articles as to whether or not a specific article has been delivered by a specific delivery service for each of the delivery services.

In order to achieve the above-mentioned objective, the delivered article receiving locker cabinet in accordance with the present invention, which is provided with: a plurality of lockers, each of which is capable of housing a delivered article and is locked, and ten keys by which numbers, such as a room number of a delivery end and a box number, are inputted, is further provided with: a barcode reader, attached to a front face of the box, for reading a barcode written on a delivery service attached note attached to the delivered article, and a memory for storing information read by the barcode reader.

Moreover, it is preferable to provide an arrangement in which a second barcode reader, which is capable of reading the barcode written on a delivery service attached note while being held by the hand, is connected to the barcode reader in parallel with each other.

DESCRIPTION OF THE EMBODIMENTS

Referring to the figures, an explanation will be given of a preferred embodiment of a delivered article receiving locker cabinet in accordance with the present invention.

Figure 1:
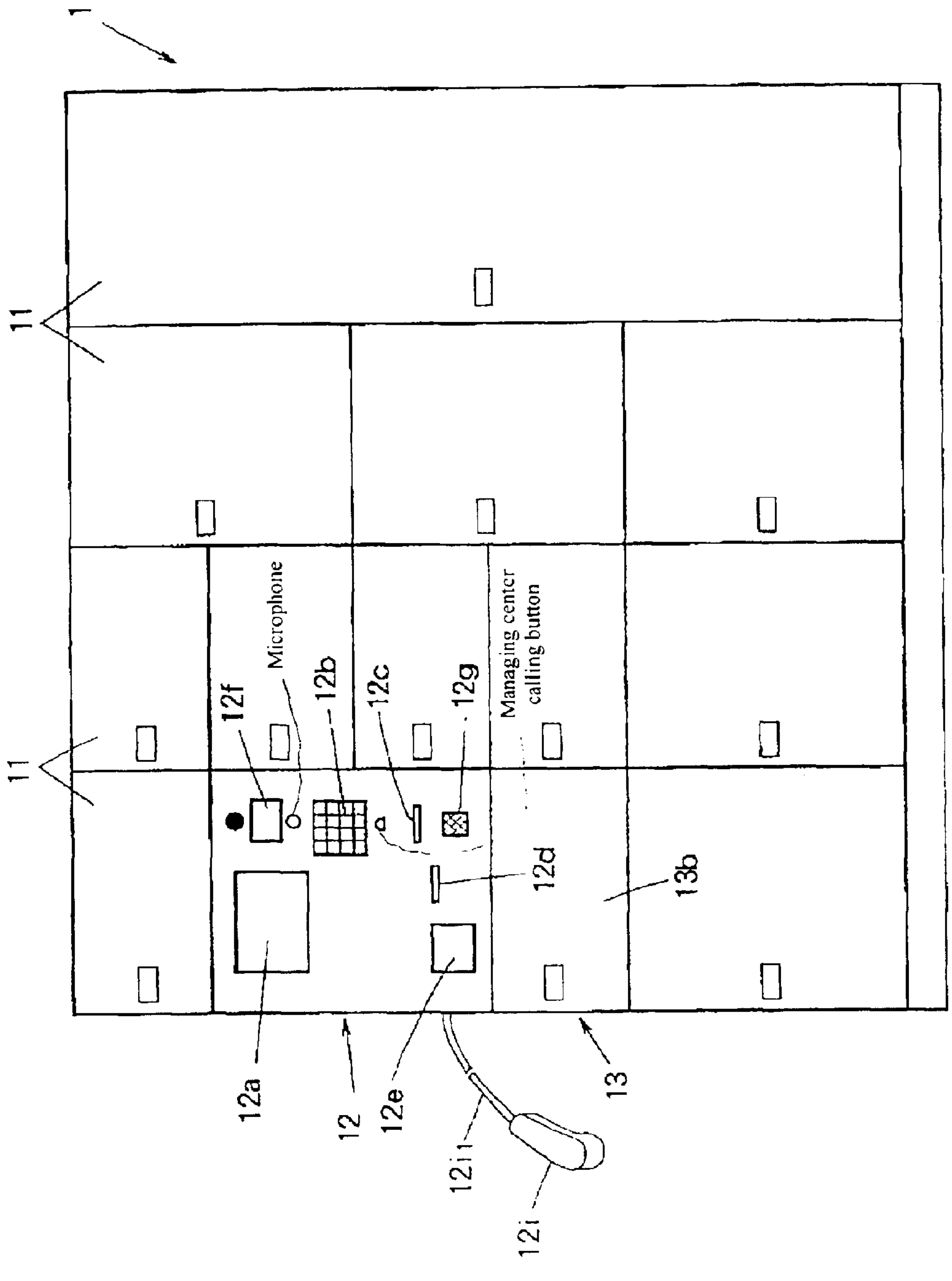
FIG. 1 is a front view that shows a delivered article receiving box in accordance with the present invention.

FIG. 1 is a front view that shows the entire structure of a delivery locker cabinet 1, in which a plurality of lockers 11 (four, in the figure) provided in the form of lockers having different sizes, are placed laterally without any gap.

An operation panel 12 is attached to one of the lockers 11, and the operation panel 12 is provided with a guide screen 12*a* showing a sequence of operations, etc., ten keys 12*b*, a card reader 12*c*, a barcode reader 12*d*, a printer 12*e* for issuing receipts, a monitor 12*f*, a speaker 12*g*, etc.

Moreover, in the locker 11, a known hand-use type second barcode reader 12*i*, which is held by the hand so as to read a barcode, is electrically connected to the barcode reader 12*d* through a lead line $\mathbf{12}i_1$.

Figure 2:
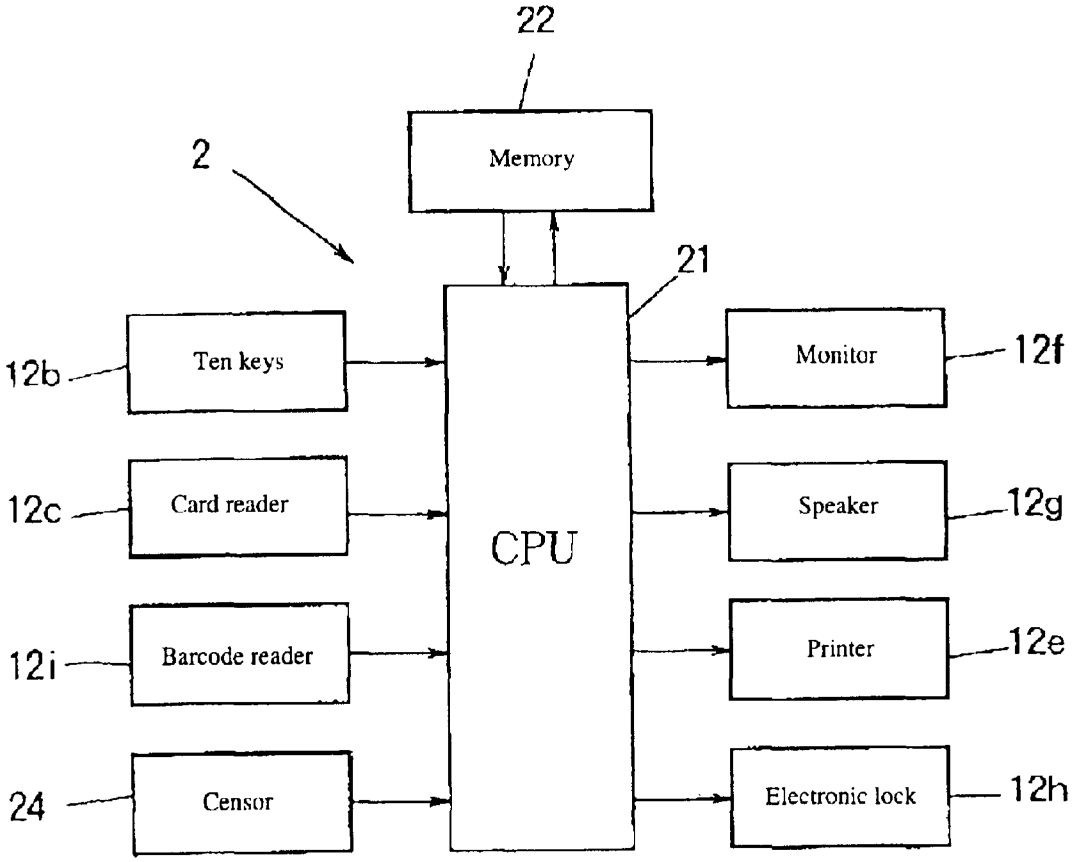
FIG. 2 is a block diagram that shows a control section of the above-mentioned box.

Next, referring to a block diagram of FIG. 2, an explanation will be given of a control circuit 2 for housing an article through operations given to the operation panel 12.

The control circuit 2 is constituted by a CPU 21, that is, a central control unit, a memory 22 for carrying out data exchanges to and from the CPU 21, and the ten keys 12*b*, the card reader 12*c*, the barcode readers 12*d*, 12*i* and a sensor 24 for detecting whether or not any delivered article is housed in any box of each locker 11 that are placed on the input side of the CPU 21 and connected thereto through an interface, not shown.

Moreover, on the output side of the CPU 21, the monitor 12*f* and the speaker 12*g* for giving a display and a voice guidance each time an operation is carried out on any of the ten keys 12*b*, card reader 12*c* and the barcode readers 12*d*, 12*i*, the printer 12*e* for outputting a receipt and a delivery note, and an electronic lock 12*h* that is opened by an electric signal released by a delivered article detection censor 24*b* upon detection of any delivered article are connected thereto through an interface, not shown.

Figure 3:
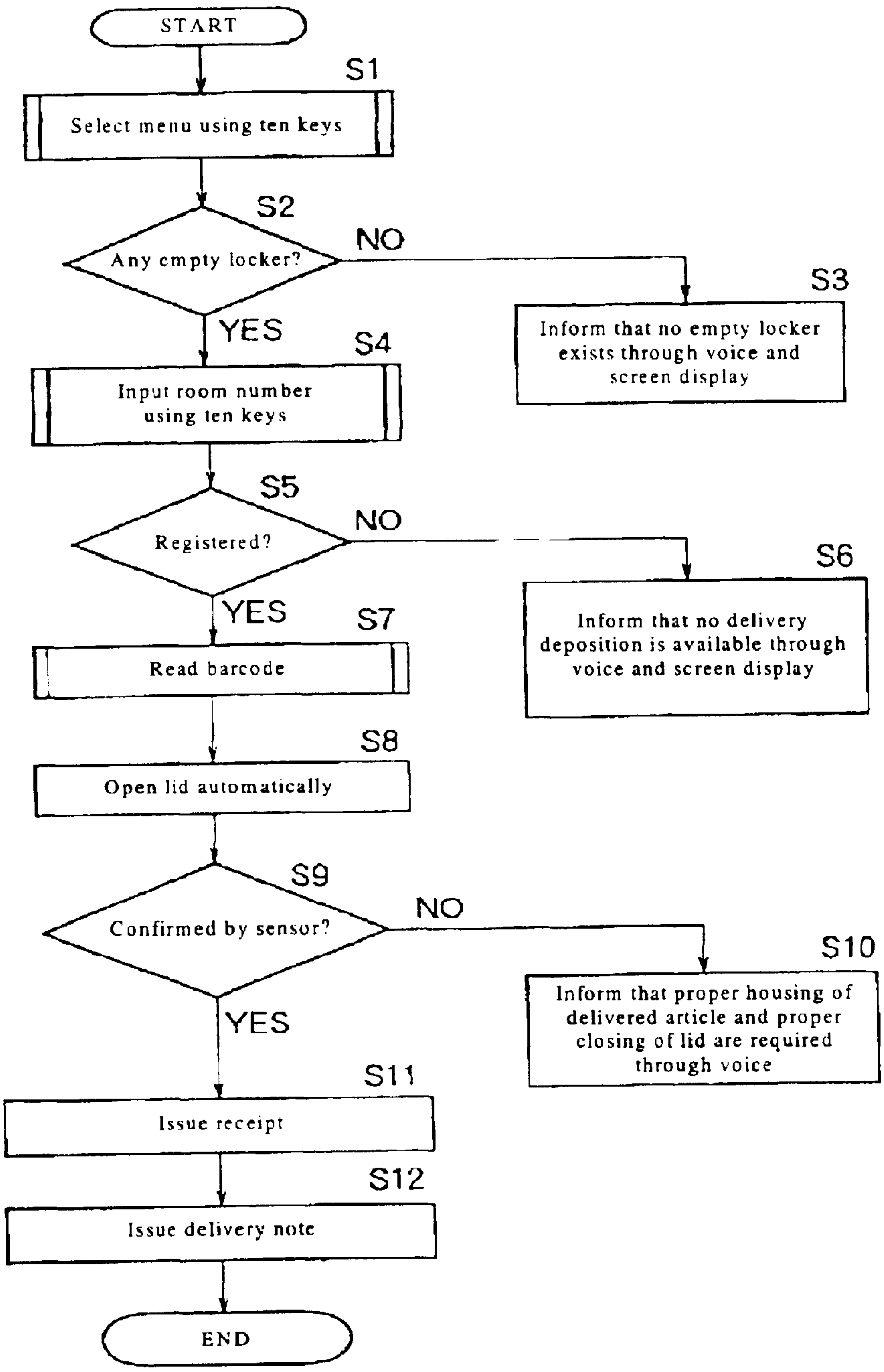
FIG. 3 is a flow chart that shows delivery operations for a delivered article.

Next, referring to FIG. 3, an explanation will be given of the operation.

In the case when a delivered article is housed by the delivery person, the delivery person informs the delivery end of the arrival of the article through the intercom, etc. at the door, and when the receiver is not at home, the delivery person makes a selection on the menu (for example, pushes "1" of the ten keys 12*b* in the case of depositing a delivered article) through the ten keys 12*b* (step S1).

In this state, the CPU 21 makes a judgment as to whether or not any empty locker exists (step S2), and if there is any empty locker, the information indicating that there is any empty locker is given to the monitor 12*f*, while if there is not any empty locker, the information indicating that there is no empty locker through the monitor 12*f* and the speaker 12*g* (step S3).

In the case when there is any empty locker, the delivery person inputs the room number of the delivery end through the ten keys 12*b* (step S4). In this state, the CPU 21 makes a judgment as to whether or not the resident of the corresponding room number inputted through the ten keys 12*f* has accepted the receipt of the delivery through lockers (step S5), and if the resident has not accepted the delivery system, the CPU 21 informs the delivery person of the fact that no delivery deposit is allowed for the room through the monitor 12*f* and the speaker 12*g* (step S6).

Next, in the case when there is any locker in which the delivery person can deposit the delivered article, the delivery person allows the barcode reader 12*d* attached to the operation panel 12 to read a barcode written on the delivery service attached note attached to the delivered article, or in the case when the delivered article is large, allows the hand-use type barcode reader 12*i* to read the barcode (step S7).

When the delivery person has selected the number of a box in which the delivered article is to be housed from the empty boxes displayed on the monitor 12*f* through the ten keys 12*b*, the lid of the selected locker is opened by the function of the electronic lock 12*h* (step S8), and the delivery person puts the delivered article into the locker, and closes the door.

Then, the CPU 21 detects whether or not the delivered article detection sensor 24 has detected the delivered article, and allows the lid sensor 24 to detect whether or not the lid has been positively closed (step S9). Here, if the delivered article detection sensor 24 has not detected the delivered article, or if the lid sensor 24 has not detected the closed state of the lid, the corresponding information indicating that the delivered article has not been properly housed or that the lid has not been closed is informed by a voice message (step S10); therefore, the delivery person again makes sure so as to properly house the delivered article or so as to properly close the lid.

At the above-mentioned step S7, it has been confirmed that the delivered article has been placed at a proper position and that the lid has been properly closed, a receipt that is to be brought by the delivery person is issued by the printer 12*e* (step S11), and a delivery note that is to be put into the mail box of the resident of the delivery end is also issued (step S12). Thus, the delivery person puts the delivery note into the mail box, thereby completing the delivery operation.

Here, the delivery conditions (the room number to which the delivered article is addressed, the box number housing the delivered article and the barcode) related to the delivery person are temporarily stored in the memory 22, and are on-line called by the managing center, and then all stored in the computer inside the managing center. Since the managing center can confirm what is delivered to which resident by which delivery service at what time, the managing center can handle any inquiry given by a resident.

Figure 4:
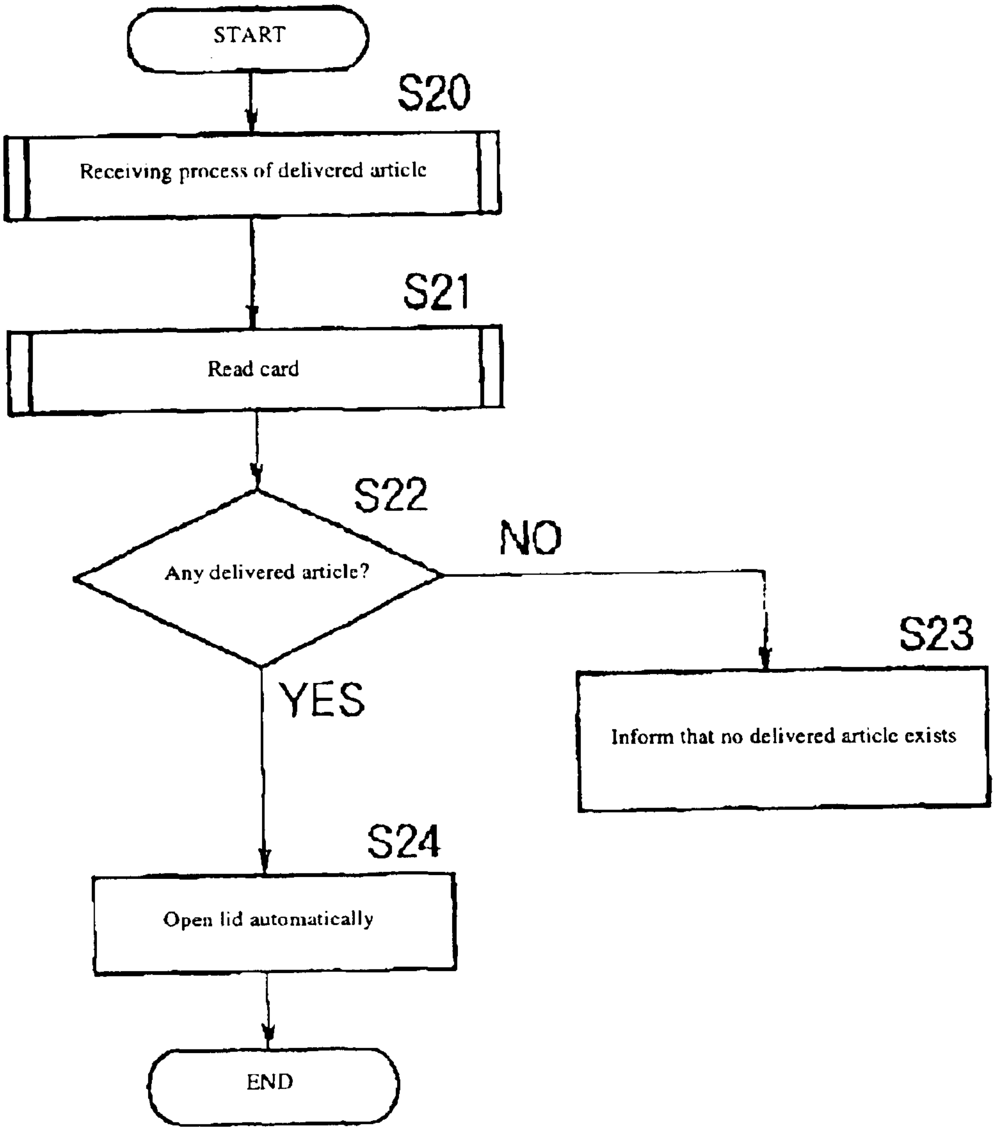
FIG. 4 is a flow chart that shows receiving operations for the delivery.

Next, referring to FIG. 4, an explanation will be given of the operation carried out when the resident receives a delivered article.

The resident, who have found the delivery note, selects the receiving process of the delivered article by operating the ten keys 12*b* (step S21). Next, when the resident inserts an article-receiving-use card that he or she possesses into the card reader 12*c*, the CPU 21 makes a judgment as to whether or not any delivered article exists (step S22), and if there is no delivered article, the corresponding information indicating that there is no delivered article is given by a voice message through the speaker 12*f* (step S23).

When such an information is not given and when any delivered article exists, the electronic lock 12*h* of the locker, in which the delivered article addressed to the room number that has been read by the card reader 12*c* is housed, is opened (step S24). Therefore, the resident takes the delivered article out, and closes the lid, thereby completing the receiving operation of the delivered article.

Here, signals indicating no detection of the article (delivered article sensor) after the delivered article has been taken out as well as indicating that the lid has been opened are stored in the memory 22, and sent to the managing center when called for, the managing center properly carries out managements as to what delivered article is delivered by which delivery service and as to which resident takes it out at what time.

As described above, a barcode on a delivery list attached to a delivered article is read by a barcode reader and stored so that the delivered article is identified by the barcode thus stored; therefore, it becomes possible to solve various problems that might occur after the delivery has been made.

Moreover, with respect to the barcode reader, two types of barcodes, that is, a barcode reader on the control panel and a hand-use type barcode reader, are prepared so that, even when a delivered article is large, it is not necessary to lift it up so as to allow the barcode reader on the control panel to read its barcode. Therefore, it is possible to make a selection as to which barcode reader is used depending on the sizes of delivered articles, and consequently to provide a simpler reading operation that is easily carried out.

What is claimed is:

1. A delivered article receiving locker cabinet comprising:

a plurality of lockers, each of which is capable of housing a delivered article and is locked, and a set of keys by which a locker number of each of said plurality of lockers; are inputted, said locker cabinet further comprising:

a barcode reader, attached to a front face thereof, for reading a barcode written on a delivery service attached note attached to the delivered article, and a memory for storing information read by the barcode reader;

a calling button;

wherein a second barcode reader, for reading the barcode written on a delivery service attached note while being held by the hand, is connected to the barcode reader in parallel with each other;

wherein a center which manages the locker cabinet can be reached through the calling button.

* * * * *